United States Patent
Kardos

(10) Patent No.: US 7,451,749 B2
(45) Date of Patent: Nov. 18, 2008

(54) COOLER DEVICE IN A VEHICLE

(75) Inventor: Zoltan Kardos, Sodertalje (SE)

(73) Assignee: Scania CV AB (SE)

( * ) Notice: Subject to any disclaimer, the term of this patent is extended or adjusted under 35 U.S.C. 154(b) by 0 days.

(21) Appl. No.: 11/576,027

(22) PCT Filed: Nov. 11, 2005

(86) PCT No.: PCT/SE2005/001697

§ 371 (c)(1),
(2), (4) Date: Apr. 3, 2007

(87) PCT Pub. No.: WO2006/054939

PCT Pub. Date: May 26, 2006

(65) Prior Publication Data

US 2008/0047533 A1 Feb. 28, 2008

(30) Foreign Application Priority Data

Nov. 17, 2004 (SE) .................................... 0402811

(51) Int. Cl.
*F02B 47/08* (2006.01)
*F02B 47/10* (2006.01)

(52) U.S. Cl. .............................................. 123/568.12

(58) Field of Classification Search ............ 123/568.12, 123/568.11, 568.22, 41.56, 41.62; 165/138, 165/139, 140
See application file for complete search history.

(56) References Cited

U.S. PATENT DOCUMENTS

| | | | | |
|---|---|---|---|---|
| 6,142,221 | A * | 11/2000 | Johansson ................... | 165/140 |
| 6,786,210 | B2 * | 9/2004 | Kennedy et al. ........ | 123/568.12 |
| 2006/0278377 | A1 * | 12/2006 | Martins et al. .............. | 165/140 |

FOREIGN PATENT DOCUMENTS

| | | |
|---|---|---|
| DE | 198 53 455 | 6/1999 |
| FR | 2 856 746 | 12/2004 |
| FR | 2 856 747 | 12/2004 |

* cited by examiner

*Primary Examiner*—Mahmoud Gimie
(74) *Attorney, Agent, or Firm*—Ostrolenk, Faber, Gerb & Soffen, LLP

(57) ABSTRACT

A cooler device in a vehicle comprises a first cooler element in which compressed air is cooled by ambient air and a second cooler element in which recirculating exhaust gases are cooled by ambient air. The cooled recirculating exhaust gases and the cooled compressed air are mixed before they are led to a supercharged combustion engine of the vehicle. The cooler device comprises a common tubular outlet element for the first cooler element and the second cooler element so that said cooler elements constitute a composite unit.

13 Claims, 2 Drawing Sheets

COOLER DEVICE IN A VEHICLE

CROSS REFERENCE TO RELATED APPLICATION

The present application is a 35 U.S.C. §§ 371 national phase conversion of PCT/SE2005/001697, filed Nov. 11, 2005, which claims priority of Swedish Application No. 0402811-4, filed Nov. 17, 2004. The PCT International Application was published in the English language.

BACKGROUND TO THE INVENTION, AND STATE OF THE ART

The present invention relates to a cooler device in a vehicle according for cooling both compressed air and recirculating exhaust gases.

The amount of air which can be supplied to a supercharged combustion engine depends on the pressure of the air but also on the temperature of the air. Supplying the largest possible amount of air to the combustion engine therefore entails cooling the compressed air in a charge air cooler before it is led to the combustion engine. The compressed air is usually cooled by ambient air flowing through the charge air cooler. The compressed air can thus be cooled to a temperature substantially corresponding to the temperature of the surroundings.

The technique known as EGR (Exhaust Gas Recirculation) is a known way of leading part of the exhaust gases from a combustion process in a combustion engine back, via a return line, to an inlet line for air supply to the combustion engine. A mixture of air and exhaust gases is thus supplied via the inlet line to the engine's cylinders in which the combustion tales place. The addition of exhaust gases to the air causes a lower combustion temperature resulting inter alia in a reduced content of nitrogen oxides $NO_x$ in the exhaust gases. This technique is applied in both Otto engines and diesel engines. The returned exhaust gases are usually cooled in a so-called EGR cooler. In a conventional EGR cooler, the exhaust gases are cooled by the coolant circulating in the vehicle's cooling system which also cools the combustion engine. The EGR cooler is thus subject to the limitation that the exhaust gases cannot be cooled to a lower temperature than the coolant temperature, which is normally well above the temperature of the surroundings.

The cooled exhaust gases are therefore usually at a higher temperature than the cooled compressed air when they mix in an inlet line to the combustion engine. The mixture of air and exhaust gases which is led to the combustion engine will therefore be at a higher temperature than the compressed air led into a supercharged combustion engine which is not provided with equipment for recirculation of exhaust gases. The performance of a supercharged combustion engine provided with recirculation of exhaust gases will therefore be somewhat inferior to that of a supercharged combustion engine not provided with such recirculation.

SUMMARY OF THE INVENTION

The object of the present invention is to provide a cooler device which occupies relatively little space and is easy to fit in a vehicle while at the same time making it possible to cool both the recirculating exhaust gases and the compressed air to a temperature substantially corresponding to the temperature of the surroundings.

This object is achieved with the cooler device in a vehicle. The cooler device comprises a first cooler element in which compressed air is cooled by ambient air and a second cooler element in which recirculating exhaust gases are cooled by ambient air. The cooled recirculating exhaust gases and the cooled compressed air are mixed before they are led to a supercharged combustion engine of the vehicle. The cooler device comprises a common tubular outlet element for both of the first cooler element and the second cooler element so that said cooler elements constitute a composite unit.

In this case both the exhaust gases and the compressed air are cooled by ambient air. The mixture of exhaust gases and compressed air can thus be cooled to a temperature substantially corresponding to the temperature of the surroundings. The performance of a supercharged combustion engine with such a cooler device may thus substantially correspond to that of a combustion engine not provided with an arrangement for recirculation of exhaust gases. As the first cooler element and the second cooler element have a common tubular outlet element, the cooler device comprises a reduced number of constituent components as compared with two cooler elements with separate tubular outlet elements. The cooler device will therefore occupy less space than two separate cooler elements. As the cooler device has a common tubular outlet element for the first cooler element and the second cooler element, the cooler device constitutes a composite unit. Such a composite unit can be made compact and is significantly easier to fit in a vehicle than two separate cooler elements. Finally, effective mixing of the exhaust gases and the compressed air will already be achieved in the tubular outlet element, thereby ensuring that a homogeneous mixture of exhaust gases and compressed air is led to the respective cylinders of the combustion engine.

According to a preferred embodiment of the present invention, the first cooler element and the second cooler element take the form of flat cooler packages which each have a main extent in one plane, whereby the first cooler element and the second cooler element are arranged relative to one another in such a way that they have an extent in a substantially common plane. With such an extent of the cooler elements they can easily be fitted in a space in the vehicle where a cooling airflow occurs in an optimum direction through the two cooler elements. With advantage, the first cooler element is situated above or below the second cooler element in a fitted state in the vehicle. Alternatively, the first cooler element and the second cooler element may be arranged side by side in said plane. With advantage, the common tubular outlet element has a substantially rectilinear portion which extends along a side edge of the first cooler element and a side edge of the second cooler element. With such a tubular outlet element, the cooler device will have a compact design on the side where the outlet element is situated.

According to a preferred embodiment of the present invention, the first cooler element and the second cooler element are arranged close to an existing third cooler element whose function it is to cool the coolant in a cooling system which is also adapted to cooling the combustion engine. Close to the existing cooler element there is already a flow region for air to pass through. Arranging the cooler device in the already existing flow region provides a simple means for air to flow also through the cooler device. In most cases it will thus be possible to use an already existing radiator fan to provide a forced airflow through the cooler device. In such cases the location of the cooler device will be such that the cooling airflow is led through the first cooler element or the second cooler element before being led through the existing third cooler element. The first cooler element and the second cooler element thus provide cooling by means of an airflow which is at the temperature of the surroundings.

According to a preferred embodiment of the present invention, the first cooler element has a tubular inlet element which has a substantially rectilinear portion which extends along a side edge of the first cooler element. This means that the first cooler element will also be of compact design on the side where the inlet element is situated. With advantage, the second cooler element likewise comprises a tubular inlet element which has a substantially rectilinear portion which extends along a side edge of the second cooler element. The second cooler element will thus likewise be of compact design on the side where the inlet element is situated. Such a configuration of outlet elements and inlet elements results in the cooler device being of very compact design with an extent substantially in one plane.

According to a preferred embodiment of the present invention, the common tubular outlet element comprises a wall element which in a first portion of the common tubular outlet element separates exhaust gases and compressed air from one another before they mix together in a second portion of the common tubular outlet element. Exhaust gases usually contain corrosive substances which may well also condense when the exhaust gases cool down. To be able to withstand such substances, the second cooler element for cooling the exhaust gases is usually made of corrosion-resistant material. To this end, the second cooler element may be made of stainless steel, which not only has resistance characteristics but also relatively good heat transfer characteristics. The compressed air contains substantially no corrosive substances. The first cooler element may therefore with advantage be made of aluminum, which has excellent heat transfer characteristics. The object of said wall element is to prevent corrosive substances from exhaust gases from flowing into the first cooler element, which might thereby be damaged.

BRIEF DESCRIPTION OF THE DRAWINGS

Preferred embodiments of the invention are described below by way of examples with reference to the attached drawings, in which.

DETAILED DESCRIPTION-OF PREFERRED EMBODIMENTS OF THE INVENTION

Figure 1:
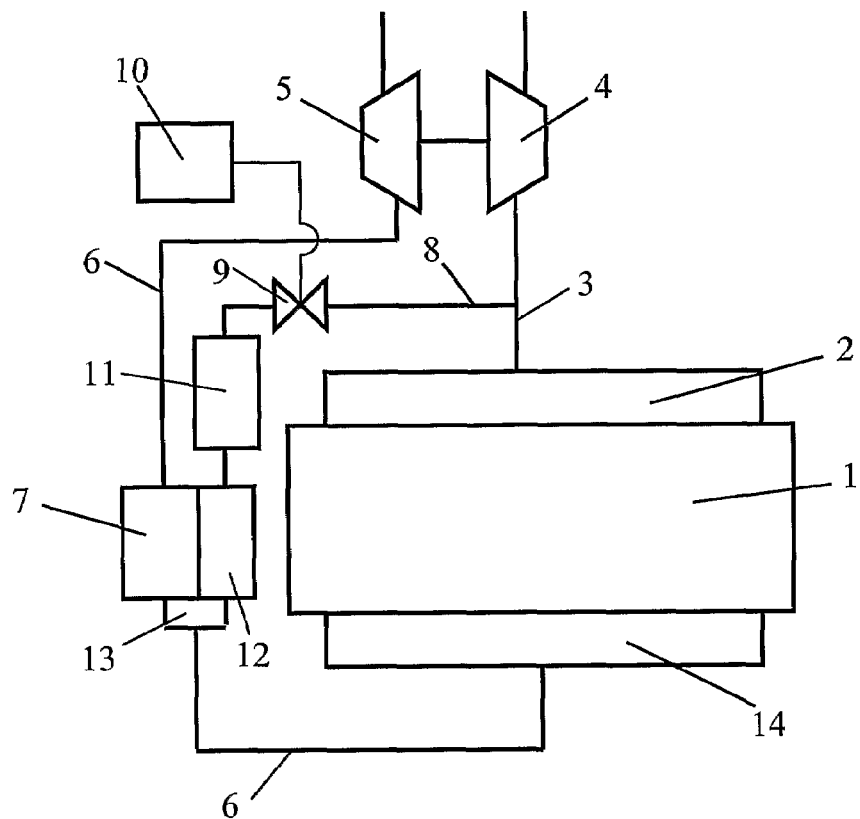
FIG. 1 depicts an arrangement for recirculation of exhaust gases of a supercharged combustion engine.

FIG. 1 depicts schematically an arrangement for recirculation of exhaust gases of a supercharged combustion engine. The combustion engine 1 may be an Otto engine or a diesel engine. Such recirculation of exhaust gases is called EGR (Exhaust Gas Recirculation). Adding exhaust gases to the compressed air which is led to the engine's cylinders lowers the combustion temperature and hence also the content of nitrogen oxides ($NO_x$) formed during the combustion processes. The combustion engine 1 may for example be intended to power a heavy vehicle. The exhaust gases from the cylinders of the combustion engine 1 are led via an exhaust manifold 2 to an exhaust line 3. The exhaust gases in the exhaust line 3, which are at above atmospheric pressure, are led to a turbine 4. The turbine 4 is thus provided with driving power which is transferred, via a connection, to a compressor 5. The compressor 5 compresses air which is led to the combustion engine 1 via an inlet line 6. A first cooler element 7 in the form of a charge air cooler is arranged in the inlet line 6. The function of the first cooler element 7 is to cool the compressed air before it is led to the combustion engine 1. The compressed air is cooled in the first cooler element 7 by ambient air.

A return line 8 is intended to provide recirculation of part of the exhaust gases from the exhaust line 3. The return line 8 comprises an EGR valve 9 by which the exhaust flow in the return line 8 can be shut off as necessary. The EGR valve 9 may be used for controlling the amount of exhaust gases led to the inlet line 6 via the return line 8. A control unit 10 is intended to control the EGR valve 9 on the basis of information about the current operating state of the combustion engine 1. The control unit 10 may be a computer unit provided with suitable software. The return line 8 comprises a conventional EGR cooler 11 in which the exhaust gases are cooled as a first step by a coolant circulating in the combustion engine's cooling system. The return line 8 also comprises a second cooler element 12 for cooling the exhaust gases as a second step. The exhaust gases are cooled in the second cooler element 12 by ambient air. The exhaust gases can thus be cooled to a temperature only a few degrees above the temperature of the surroundings. The first cooler element 7 and the second cooler element 12 thus constitute a composite cooler device which comprises a common tubular outlet element 13 in which the cooled exhaust gases and the cooled compressed air initially mix. After the exhaust gases have mixed with the compressed air in the outlet element 13 and in a continuation of the inlet line 6, the mixture is led via a manifold 14 to the respective cylinders of the combustion engine 1.

During operation of the combustion engine 1, the exhaust gases in the exhaust line 3 drive the turbine 4. The turbine 4 is thus provided with driving power which drives a compressor 5. The compressor 5 compresses air which is led into the inlet line 6. In most operating states of the combustion engine 1, the control unit 10 keeps the EGR valve 9 open so that part of the exhaust gases in the exhaust line 3 is led into the return line 8. At this stage the exhaust gases are at a temperature of about 600-700° C. When the exhaust gases in the return line 8 reach the EGR cooler 11, they undergo cooling, as a first step, by the coolant of the cooling system. The exhaust gases undergo here their main temperature decrease. However, the EGR cooler 11 is subject to the limitation that it can at best only cool the exhaust gases to a temperature substantially corresponding to the temperature of the coolant. The temperature of the coolant in the cooling system may vary but in normal operation it is usually within the range 80-100° C. The amount of compressed air and exhaust gases which can be supplied to the diesel engine 1 depends on the pressure of the air and exhaust gases but also on their temperature. It is therefore important to provide substantially optimum cooling of the recirculating exhaust gases. The exhaust gases are therefore led into the second cooler element 12, in which they are cooled by ambient air. Using ambient air as cooling medium makes it possible to cool the exhaust gases down to a temperature close to that of the surrounding air. Exhaust gases can thus be cooled to substantially the same temperature in the second cooler element 12 as the compressed air in the first cooler element 7.

Figure 2:
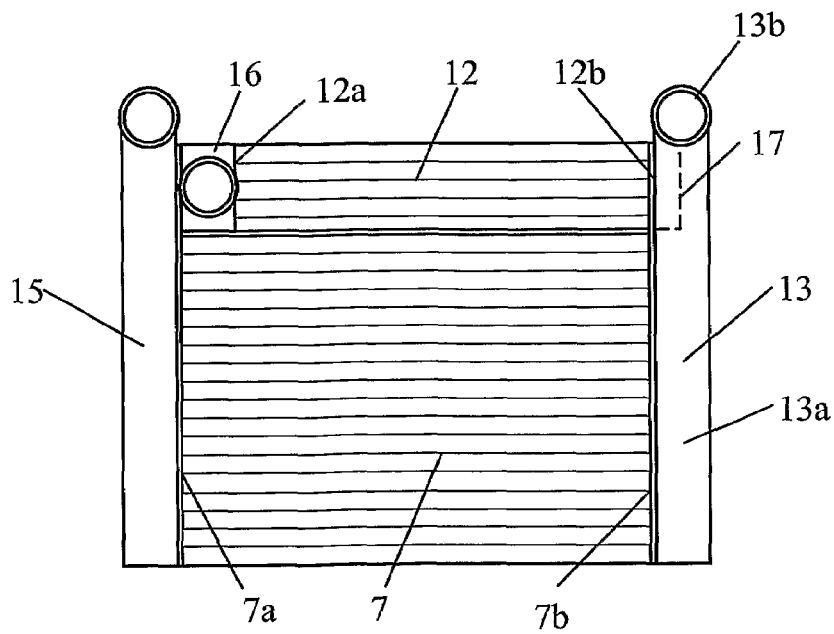
FIG. 2 depicts a cooler device according to a first embodiment.

FIG. 2 depicts the composite cooler device comprising the first cooler element 7 which with advantage is made of aluminium and the second cooler element 12 which with advantage is made of stainless steel. The first cooler element 7 and the second cooler element 12 comprise pipelines and cooling flanges which together constitute substantially flat cooler packages which have an extent in substantially one plane. In this case the second cooler element 12 is fitted above the first cooler element 7 in such a way that they have an extent in a substantially common plane. During operation, the compressed air is led into the first cooler element 7 via a first tubular inlet element 15 which has a substantially rectilinear extent along a side edge 7a of the first cooler element. The inlet element 15 has internal apertures close to said side edge 7a so that the compressed air is led substantially uniformly to existing flow channels in the first cooler element 7. The cooled compressed air is led out via apertures in a side edge 7b of the first cooler element to the common tubular outlet portion 13. The inlet element 15 and the outlet element 13 are arranged at opposite side edges 7a,b of the first cooler element.

The recirculating exhaust gases are led into the second cooler element 12 via a relatively short second tubular inlet element 16 which has a rectilinear extent along a side edge 12a of the second cooler element. The inlet element 16 has apertures so that the exhaust gases are led substantially uniformly to existing flow channels in the second cooler element 12. The cooled exhaust gases are led thereafter out to the common tubular outlet portion 13 via a side edge 12b. The inlet element 16 and the outlet element 13 are arranged at opposite side edges 12a,b of the second cooler element. A wall element 17 is arranged inside the tubular outlet portion 13 close to the outlet of the exhaust gases in the tubular outlet portion 13. This means that the flow of compressed air from the first cooler element 7 and the exhaust gases from the second cooler element 12 will not mix directly in the tubular outlet portion 13. When the exhaust gases cool down in the second cooler element 12, there is risk of corrosive substances in the exhaust gases condensing on the inside walls of the second cooler element 12. The purpose of said wall element 17 is to prevent corrosive substances from the exhaust gases, particularly in the form of condensate, running back downwards in the outlet element 13 and accumulating in the first cooler element 7, which may be made of a material such as aluminium which is not entirely resistant to such substances. The common tubular outlet element 13 therefore comprises a wall element 17 which separates exhaust gases and compressed air from one another in a first straight portion 13a of the common tubular outlet element in a region which extends substantially to the upper edge of the second cooler element 12. Exhaust gases and compressed air therefore only mix together in a curved second portion 13b of the common tubular outlet element. Such a composite cooler device is compact and will occupy a relatively limited fitting space in a vehicle.

Figure 3:
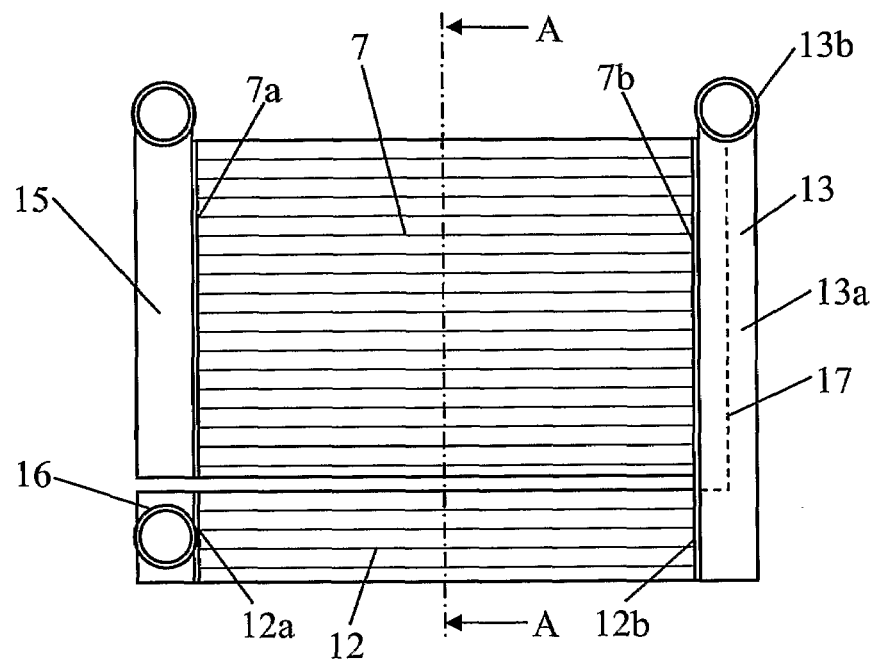
FIG. 3 depicts a cooler device according to a second embodiment and FIG. 4 depicts a cross-section of the cooler device in FIG. 3 along the plane A-A.

FIG. 3 depicts an alternative embodiment of the cooler device. This embodiment differs from the embodiment in FIG. 2 in that the first cooler element 7 is instead arranged above the second cooler element 12. In this case the wall element 17 is made significantly longer to prevent exhaust gases in the tubular outlet element 13 from flowing into the first cooler element 7. The wall element 17 has in this case an extent up to substantially the upper edge of the first cooler element 7. Here again, exhaust gases and compressed air therefore only start mixing together in the curved second portion 13b of the common tubular outlet element.

Figure 4:
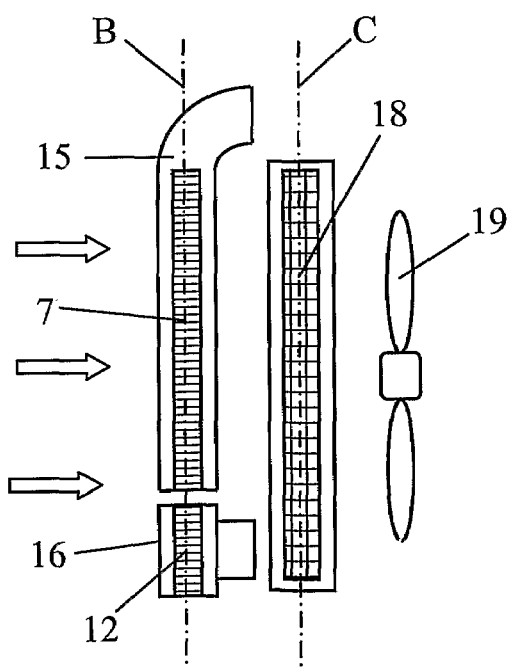

FIG. 4 depicts a sectional view along the plane A-A in FIG. 3. In this case the cooler device is situated in a front portion of the vehicle forward of an ordinary cooler (radiator) element 18 for cooling the coolant in the cooling system which cools the combustion engine 1. This means that an existing radiator fan 19 can be used to draw air through both the cooler device according to the present invention and the ordinary cooler element 18. The first cooler element 7 and the second cooler element 12 are arranged in a common plane B at a distance from the main plane of extent C of the conventional cooler element 18. The first cooler element 7 and the second cooler element 12 are so arranged that their common plane of extent B is parallel with the main plane of extent C of the conventional cooler element 18. In this case, ambient air flows through the first cooler element 7 or the second cooler element 12 before flowing through the conventional cooler 18. The airflow towards the cooler elements 7, 12, 18 is represented by arrows in FIG. 4. The cooling air flow is led mainly at right angles through the main planes of extent B, C of the cooler elements 7, 12, 18.

The invention is in no way limited to the embodiment depicted in the drawing but may be varied freely within the scopes of the claims. It is for example not necessary that in all contexts a wall element be arranged in the outlet element to prevent exhaust gases from being led into the first cooler element.

The invention claimed is:

1. A cooler device for a supercharged combustion engine in a vehicle, the cooler device comprising:
    a first cooler element operable to cool compressed air by ambient air;
    a second cooler element operable to cool recirculating exhaust gases by ambient air;
    a mixing region configured to mix the cooled recirculating exhaust gases and the cooled compressed air before the mixed gases are led to the supercharged combustion engine of the vehicle; and
    a common tubular outlet element leading from the first cooler element and the second cooler element whereby the first cooler element and the second cooler element constitute a composite unit.

2. A cooler device according to claim 1, wherein each of the first cooler element and the second cooler element is a flat cooler package having an extent in substantially one plane, and the first cooler element and the second cooler element are situated relative to one another in such a way that together they have an extent in a substantially common plane.

3. A cooler device according to claim 2, wherein the first cooler element is arranged above or below the second cooler element in a fitted state in the vehicle and the first cooler element and the second cooler element are in one plane.

4. A cooler device according to claim 3, wherein each of the first cooler element and the second cooler element have side edges; and
    the common tubular outlet element has a substantially rectilinear portion extending along a side edge of the first cooler element and also along a side edge of the second cooler element.

5. A cooler device according to claim 2, further comprising a third cooler element, the first cooler element and the second cooler element being arranged close to the third cooler element, the third cooler element being operable to cool a coolant in a cooling system for cooling the combustion engine.

6. A cooler device according to claim 1, wherein the first cooler element has side edges and comprises a tubular inlet element which has a substantially rectilinear portion which extends along one of the side edges of the first cooler element.

7. A cooler device according to claim 6, wherein the second cooler element has second side edges and comprises a tubular inlet element which has a substantially rectilinear portion which has an extent along one of the second side edges of the second cooler element.

8. A cooler device according to claim 1, wherein the common tubular outlet element comprises a first portion, a second portion and a wall element positioned in the first portion of the common tubular outlet element and configured to separate exhaust gases and compressed air from one another before they are mixed together in the second portion of the common tubular outlet element.

9. A cooler device according to claim 1, wherein the first cooler element is comprised of stainless steel.

10. A cooler device according to claim 9, wherein the second cooler element is comprised of aluminum.

11. A cooler device according to claim 1, wherein the second cooler element is comprised of aluminum.

12. A cooler device according to claim 5, wherein the first and second cooler elements are in a vertical plane and the third cooler element is in another vertical plane.

13. A cooler device according to claim 12, wherein the third cooler element is behind the first and second cooler elements in the path of cooling air flow through the engine.

* * * * *